US008947583B2

(12) United States Patent
Nakagawara

(10) Patent No.: US 8,947,583 B2
(45) Date of Patent: Feb. 3, 2015

(54) IMAGE PICKUP APPARATUS AND CONTROL METHOD THEREOF

(75) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/487,793

(22) Filed: Jun. 4, 2012

(65) Prior Publication Data

US 2012/0320258 A1 Dec. 20, 2012

(30) Foreign Application Priority Data

Jun. 15, 2011 (JP) ................................ 2011-133101

(51) Int. Cl.

*H04N 5/232* (2006.01)
*G03B 13/00* (2006.01)
*H04N 5/347* (2011.01)
*G03B 13/36* (2006.01)

(52) U.S. Cl.

CPC ....... *H04N 5/23212* (2013.01); *H04N 5/23219* (2013.01); *H04N 5/347* (2013.01); *G03B 13/36* (2013.01)
USPC .......................................... 348/349; 348/348

(58) Field of Classification Search

CPC .......... H04N 5/23212; H04N 5/23219; H04N 5/2352; H04N 5/2353; H04N 5/232; H04N 5/23245; H04N 5/2258
USPC ........................................................ 348/349
See application file for complete search history.

(56) References Cited

U.S. PATENT DOCUMENTS

| | | | | |
|---|---|---|---|---|
| 8,189,092 | B2 * | 5/2012 | Koh et al. | 348/349 |
| 2008/0122939 | A1 * | 5/2008 | Hirai | 348/222.1 |
| 2009/0303378 | A1 * | 12/2009 | Yoshimatsu et al. | 348/348 |

FOREIGN PATENT DOCUMENTS

JP 2008-262001 10/2008

* cited by examiner

*Primary Examiner* — Twyler Haskins
*Assistant Examiner* — Padma Haliyur
(74) *Attorney, Agent, or Firm* — Cowan, Liebowitz & Latman, P.C.

(57) ABSTRACT

A controller configured to move a lens to reduce a defocus amount of a focus area selected from among a plurality of focus areas, wherein the controller repeats a detection of a defocus amount while moving the lens, and performs a selection of a focus area by using face position information, which is obtained and output by the first detection unit after detection of the defocus amount is repeated a plurality of times.

20 Claims, 6 Drawing Sheets

AE
ICPU
MEMORY
CPU
MEMORY
AF
LPU
100
101
102
103
104
105
106
107
108
109
110
111
112
113
200
201
202

FIG. 5

| | NORMAL AUTO-SELECTION ONE-SHOT AF | | FACE DETECTION AUTO-SELECTION ONE-SHOT AF | |
|---|---|---|---|---|
| OPEN FNo | FOCUS CLOSEOUT WIDTH | IN-FOCUS WIDTH | FOCUS CLOSEOUT WIDTH | IN-FOCUS WIDTH |
| 1.8 | ±120 μm | ±20 μm | ±360 μm | ±60 μm |
| 2.8 | ±180 μm | ±30 μm | ±540 μm | ±90 μm |
| 4 | ±240 μm | ±40 μm | ±720 μm | ±120 μm |
| 5.6 | ±360 μm | ±50 μm | ±900 μm | ±150 μm |

IMAGE PICKUP APPARATUS AND CONTROL METHOD THEREOF

BACKGROUND OF THE INVENTION

1. Field of the Invention

The present invention relates to an image pickup apparatus, which is capable of face detection autofocus for performing face detection and causing the detected face to be in focus, a control method thereof, and a program.

2. Description of the Related Art

Recently, in a single lens reflex camera, a system which acquires an image signal through a photometry sensor of a penta unit prior to a photographing and processes the image signal to perform photometry and face detection has appeared. This system may perform face detection through the photometry sensor of the penta unit prior to a main photographing, perform autofocus (AF) by focusing a distance measurement point on a face-detected position in accordance with the information of the face detection, and perform a main photographing in a state in which the face is in focus. For example, Japanese Patent Application Laid-Open No. 2008-262001 discloses an image pickup apparatus which starts a face detection processing when a release button is half depressed in a face detection mode, and when a face is detected, determines a lens movement distance by roughly calculating distance to a person's face on the basis of a calculation result of a face area size.

However, as compared to a normal auto-selection one-shot AF, a face detection auto-selection one-shot AF which acquires an image signal through a photometry sensor of a penta unit, performs face detection, and performs AF at a face-detected position has a problem in that it takes a longer time due to a period of time during which the face detection is performed.

SUMMARY OF THE INVENTION

The present invention has been made in consideration of the above situation, and reduces face detection autofocus time for performing face detection to cause a face to be in focus.

According to the present invention, an image pickup apparatus includes: a first detection unit arranged to detect a position of a face from a signal obtained through photoelectric conversion by a first sensor; a second detection unit arranged to detect a defocus amount of a plurality of focus areas from a signal obtained through photoelectric conversion by a second sensor; and a controller configured to control to move a lens to reduce a defocus amount of a focus area selected from among the plurality of focus areas, wherein the controller repeats a detection of a defocus amount by the second detection unit while moving the lens, and performs a selection of a focus area by using face position information, which is obtained and output by the first detection unit after detection of the defocus amount is repeated a plurality of times.

Further features of the present invention will become apparent from the following description of exemplary embodiments with reference to the attached drawings.

BRIEF DESCRIPTION OF THE DRAWINGS

FIG. 5 is a diagram illustrating an example of an in-focus width and a focus closeout width in normal auto-selection one-shot AF and face detection auto-selection one-shot AF.

DESCRIPTION OF THE EMBODIMENTS

Hereinafter, exemplary embodiments of the present invention will be described with reference to the accompanying drawings.

Figure 1:
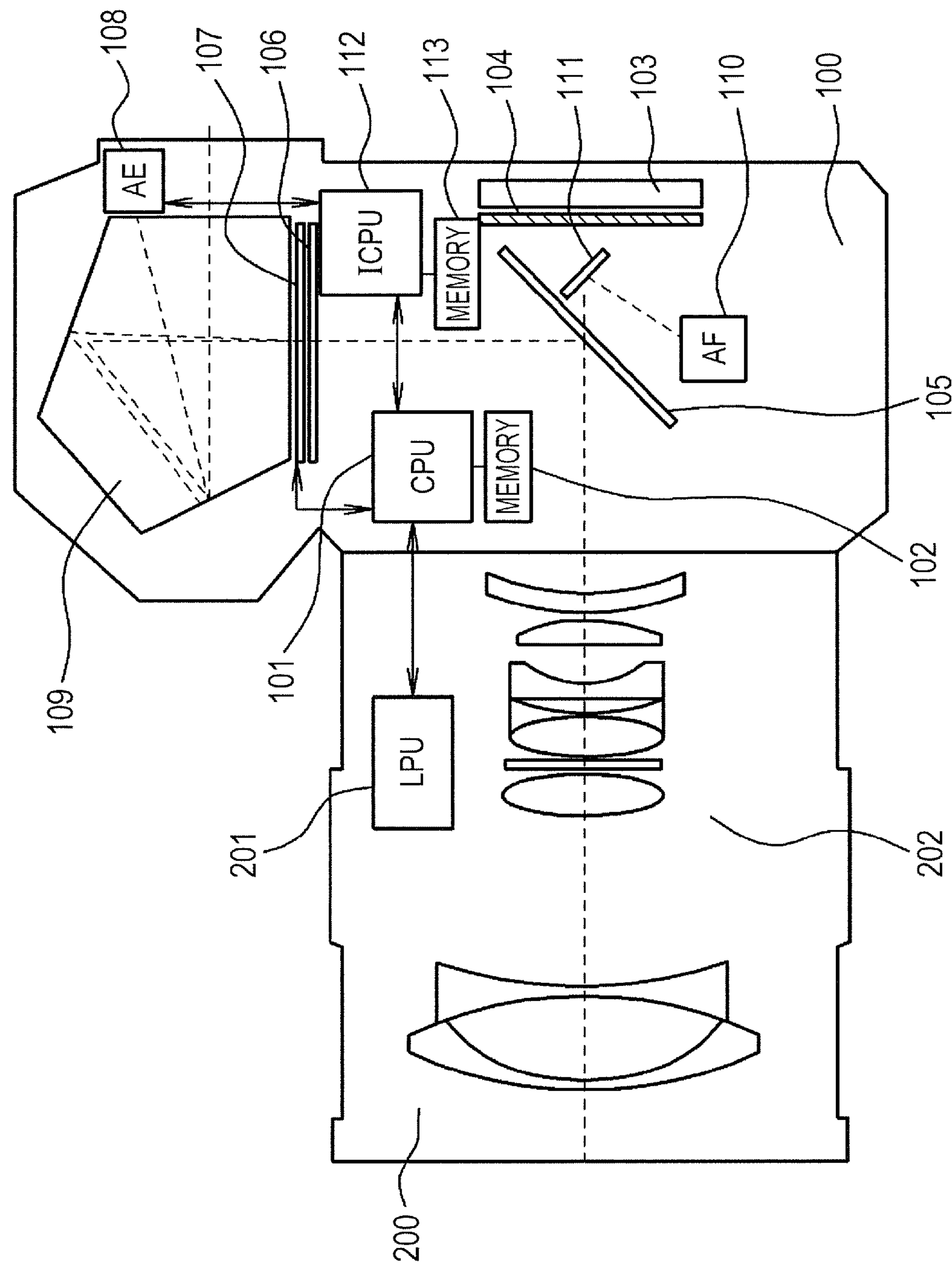
FIG. 1 is a diagram illustrating a configuration of a camera system according to an embodiment of the invention.

FIG. 1 is a diagram illustrating a configuration of a camera system, which is an image pickup apparatus, according to an embodiment of the present invention. The camera system includes a camera body 100 and a lens unit 200. The camera system according to the embodiment is capable of face detection auto-selection one-shot autofocus (AF) for performing face detection to cause a face to be in focus.

In the camera body 100, a microcomputer CPU (hereinafter, referred to as a camera microcomputer) 101 controls each unit of the camera system. A memory 102, such as a RAM or a ROM, is connected to the camera microcomputer 101. An image pickup unit 103 includes an image pickup element, such as a CCD or a CMOS. The image pickup unit 103 includes an infrared cut filter or a low-pass filter and an object image during photographing by the lens unit 200 is focused thereon. A shutter 104 shields the image pickup element of the image pickup unit 103 from light during non-photographing, and is opened during photographing to guide light to the image pickup element.

The camera system includes a half-mirror 105 and a focus plate 106. The half-mirror 105 forms an image on the focus plate 106 by reflecting a part of light incident from the lens unit 200 during non-photographing.

Figure 6:
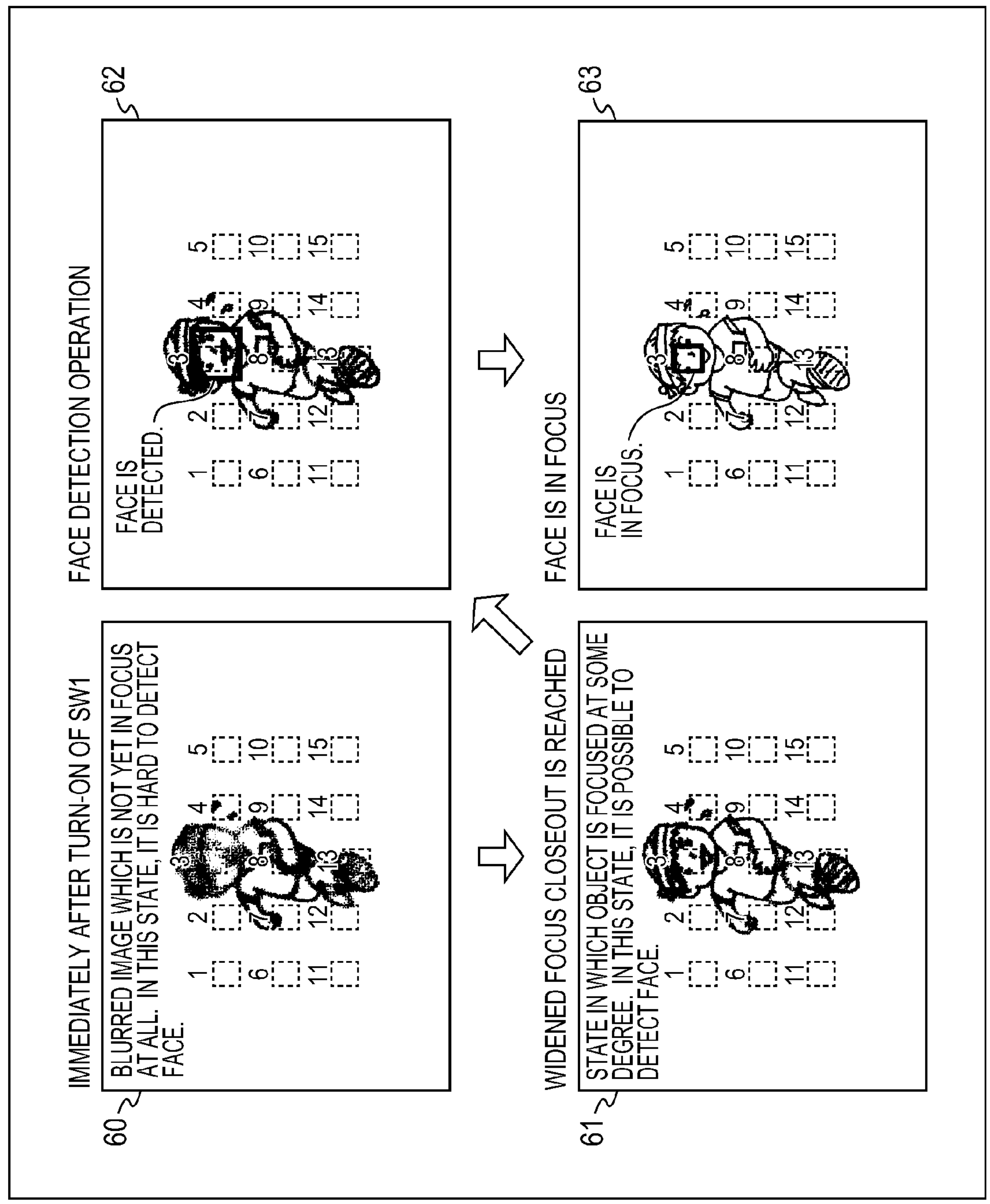
FIG. 6 is a diagram for explaining a focusing state appearing until a face is caused to be in focus in face detection auto-selection one-shot AF.

A display element 107, such as a PN liquid crystal, displays an AF distance measurement frame. The display element 107 shows a user to which position in the object image the AF is performed, when the user squints into an optical viewfinder. FIG. 6 illustrates an example of an arrangement of the display element configured to display the AF distance measurement frame. A position of the AF distance measurement frame is indicated by dotted lines. In the PN liquid crystal, a liquid crystal of an AF distance measurement frame selected by an instruction from the camera microcomputer 101 diffuses so that the AF distance measurement frame is displayed.

A linear output type photometry sensor 108 uses an image pickup element, such as a CCD or a CMOS, to perform face detection and tracking as well as photometry. A penta prism 109 guides the object image of the focus plate 106 to the photometry sensor 108 and the optical viewfinder. The photometry sensor 108 is arranged to look the object image formed on the focus plate 106 through the penta prism 109 from an oblique position.

A focus detection circuit 110 performs focus detection in accordance with a phase difference detection method. Numeral 111 demotes an AF mirror 111. Distance measurement according to the phase difference detection method is performed by guiding a part of light beams, which are incident from the lens unit 200 and pass through the half-mirror 105, to a sensor arranged in the focus detection circuit 110 through the AF mirror 111.

A CPU 112 for image processing and operation of the photometry sensor 108 (hereinafter, referred to as AECPU) performs a face detection operation, a tracking operation, a photometry operation, and the like. A memory 113, such as a RAM or a ROM, is connected to the AECPU 112. In the embodiment, although the CPU 112 dedicated to the photometry sensor 108 is provided, a processing may be performed by the camera microcomputer 101 or the like.

In the lens unit 200, a CPU (hereinafter, referred to as a lens control microcomputer (lens processing unit (LPU)) 201 sends information on a distance to an object or the like to the camera microcomputer 101. A lens group 202 includes focus lenses.

Next, a sequence of face detection auto-selection one-shot AF by the camera system according to the embodiment will be described with reference to FIG. 2. In the following description, an AE sensor and an AF sensor refer to sensors themselves and also refer to photometry units and autofocus units including CPUs of the respective processing systems or the like.

First, when a camera release switch is half depressed (SW1 ON of FIG. 2), each of the AE sensor and the AF sensor starts charge accumulation, as shown in step S1-1. After the charge accumulation, when each of the AE sensor and the AF sensor completes readout of the respective accumulated charges, the AE sensor starts a photometry operation, and the AF sensor starts a distance measurement operation in accordance with a phase difference detection method on the basis of an AF auto-selection algorithm. When the AF sensor completes the distance measurement operation, a lens of the lens unit 200 is driven based on the operation result.

As shown in steps S1-2 to S1-*n*, the AE sensor and the AF sensor repeat the above processing until reaching an in-focus state (called "a focus closeout") by once more lens drive. At the time of the face detection auto-selection one-shot AF, a focus closeout width for determining that the focus closeout is reached is set to be wider than a focus closeout width of the normal auto-selection one-shot AF that performs no face detection.

When reaching the focus closeout, as shown in step S2, the AE sensor starts face detection accumulation $A_{face}$, and the AF sensor starts last accumulation $B_{n+1}$ prior to in-focus. After the charge accumulation, the AE sensor starts a face detection operation when readout of the face detection accumulation $A_{face}$ is completed, and sends face detection information to the AF sensor when the face detection operation is completed. At this time, the readout of the face detection accumulation $A_{face}$ may be performed by full pixel readout so as to perform the face detection. Also, when the readout of the last accumulation $B_{n+1}$ prior to the in-focus is completed, the AF sensor starts a distance measurement operation in accordance with a phase difference detection method on the basis of an AF auto-selection algorithm. Thereafter, the AF sensor performs a distance measurement operation (distance measurement point reselection operation) again in accordance with a phase difference detection method on the basis of the face detection information from the AE sensor, and the lens of the lens unit 200 is driven to cause the face to be in focus on the basis of the operation result.

After the in-focus is obtained, as shown in step S3, the AE sensor starts last accumulation $A_{last1}$ prior to release permission, and calculates a final photometry value by performing a photometry operation when the readout of $A_{last1}$ is completed. When the above processing is completed, a main photographing is permitted (release permission of FIG. 2).

Herein, prior to the release permission in step S3, the readout of the last accumulation $A_{last1}$ may be performed by pixel addition readout from the viewpoint of time reduction. By performing the pixel addition readout, readout time may be reduced, and time until the release permission may be reduced.

Figure 3:
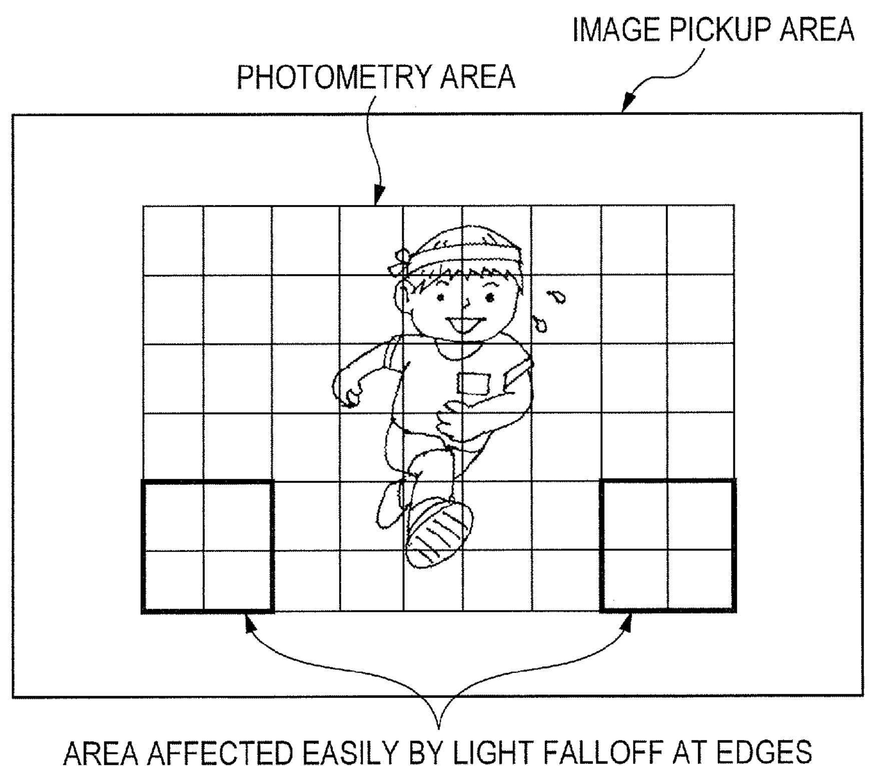
FIG. 3 is a diagram describing a photometry operation method after last in-focus.

Also, the photometry operation after the last in-focus in step S3 may be performed using both results of the accumulations at the time of the focus closeout, that is, the face detection accumulation $A_{face}$ and the accumulation $A_{last1}$ at the time of the last in-focus. An example of the photometry operation will be described below. Since the photometry sensor 108 is arranged to look an object field at an oblique position, an image is greatly affected by light falloff at edges of the lens, as illustrated in FIG. 3, as compared to an image acquired by the image pickup element. For this reason, in an area where the light falloff at edges is great, it is likely that a correct photometry value will not be obtained. Therefore, an area having the light falloff at edges may be compensated for by the image $A_{last1}$ (pixel addition readout image) obtained by the accumulation at the time of the last in-focus as well as the image obtained by the face detection accumulation $A_{face}$. For example, when assuming that accumulation time is equal, a two ranks brighter image may be obtained in the case in which the accumulation $A_{last1}$ at the time of the last in-focus is read out by 4-pixel addition, and a three ranks brighter image may be obtained in the case of 8-pixel addition. As such, by using the image for face detection and the image obtained by the last in-focus, the photometry operation may be performed in such a manner that a dynamic range at a low luminance side may be widened.

Figure 7:
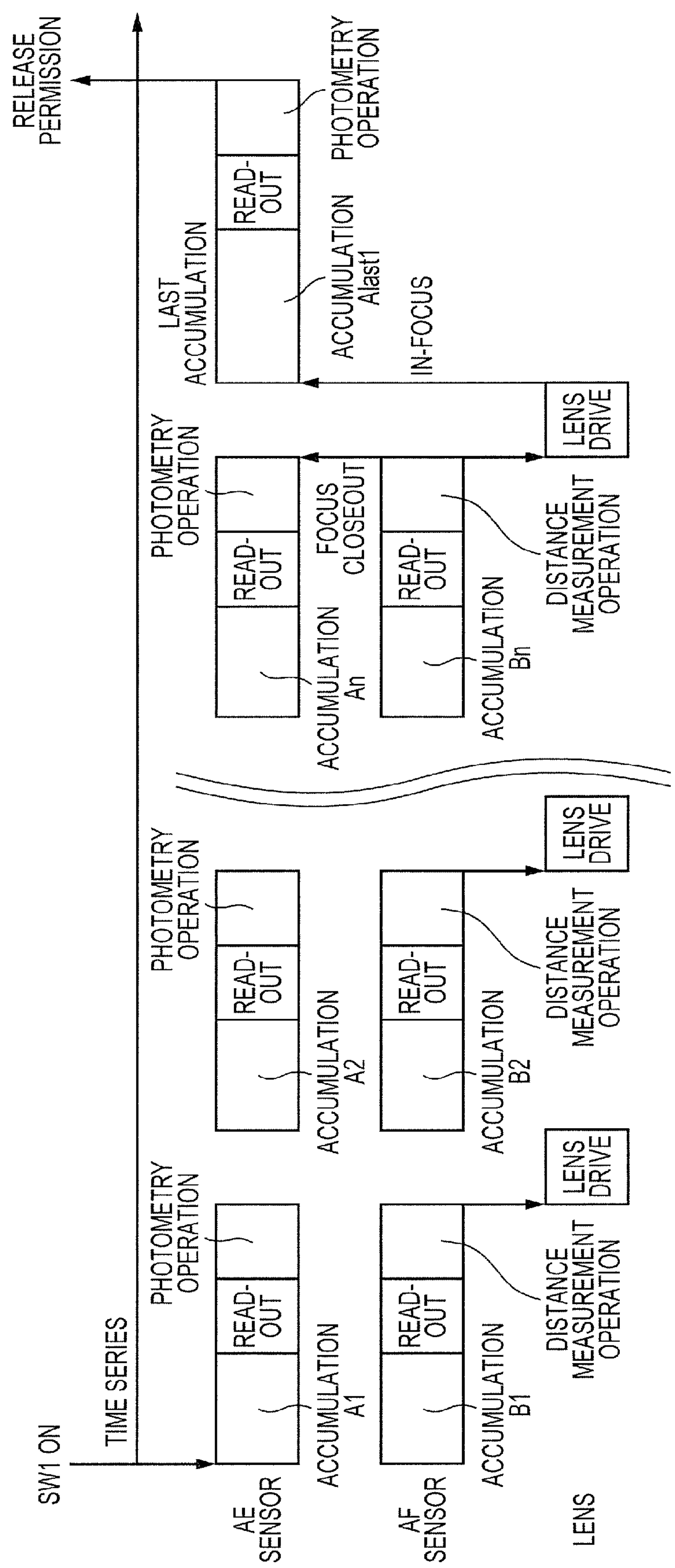
FIG. 7 is a sequence diagram of normal auto-selection one-shot AF.

For comparison with the sequence of the face detection auto-selection one-shot AF, the sequence of the normal auto-selection one-shot AF is illustrated in FIG. 7. In the normal auto-selection one-shot AF, when reaching the focus closeout, the AE sensor starts last accumulation $A_{last1}$ prior to release permission, and performs a photometry operation when the readout of $A_{last1}$ is completed. Also, the lens of the lens unit 200 is driven based on the operation result of the distance measurement operation in the AF sensor.

Figure 4:
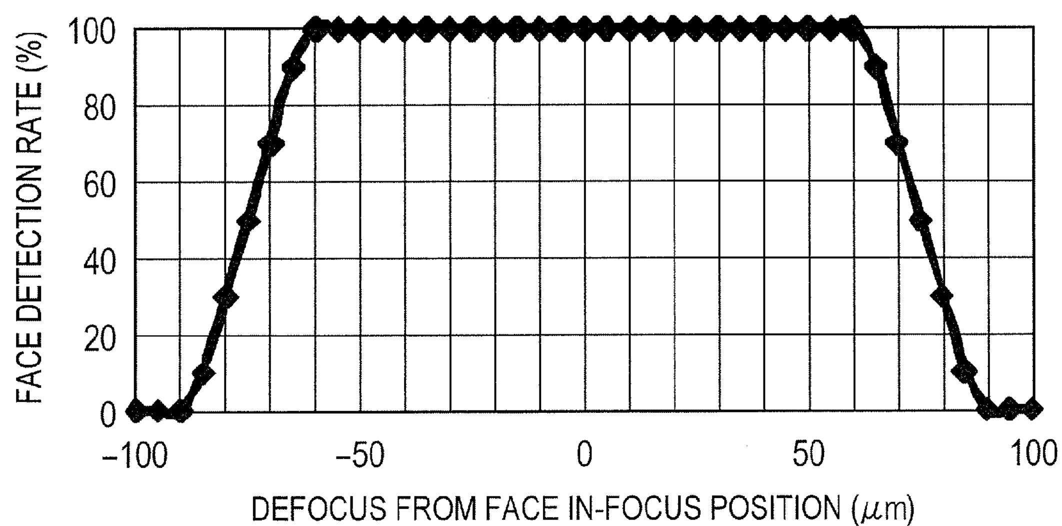
FIG. 4 is a characteristic diagram illustrating a relation between a defocus from a face in-focus position and a face detection rate.

Next, a method for setting a focus closeout width at the time of face detection auto-selection one-shot AF will be described. FIG. 4 illustrates a graph showing a relation between a defocus from a face in-focus position and a face detection rate when a face size is 3 mm on a focus plate. It can be seen from this graph that about 100% of face detection is possible even when the defocus from the face in-focus position is about ±60 μm, but the face detection rate becomes worse when the defocus is ±65 μm or more. Therefore, the focus closeout width at the time of the face detection auto-selection one-shot AF may be set to ±60 μm in a case where the lens is driven after the focus closeout of the sequence of FIG. 2. Also, since the focus closeout width also changes depending on FNo of the lens, it may be set according to the lens. Also, the graph of FIG. 4 changes according to the size of the detected face. Therefore, when a user wants to realize about 100% of the detection rate with a smaller face, it is necessary to narrow the focus closeout width by sampling data of that case.

FIG. 5 illustrates an example of the in-focus width and the focus closeout width in the normal auto-selection one-shot AF and the face detection auto-selection one-shot AF. The focus closeout width in the face detection auto-selection one-shot AF is set to be wider than the focus closeout width in the normal auto-selection one-shot AF. The in-focus width in the face detection auto-selection one-shot AF represents an in-focus width of an object, for the first lens drive immediately after focus closeout.

Next, how the face of the object is actually focused will be described with reference to FIG. 6. As indicated by reference numeral 60, immediately after turn-on of SW1, a blurred image which is not yet in focus at all is assumed. In this state, it is hard to detect a face.

Figure 2:
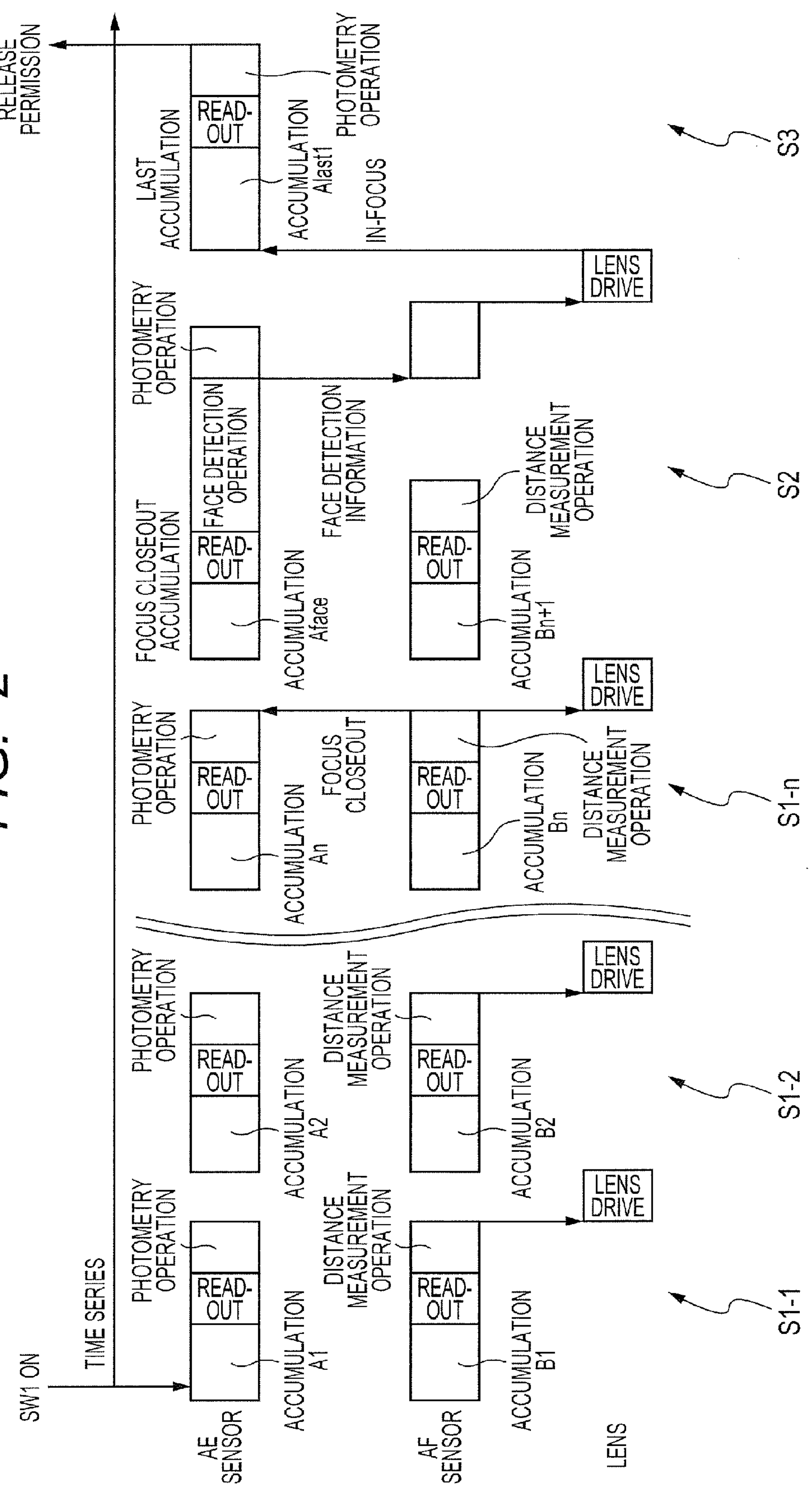
FIG. 2 is a sequence diagram of face detection auto-selection one-shot AF by a camera system according to an embodiment of the invention.

Next, the lens is driven in accordance with the normal AF auto-selection algorithm to gradually cause the object image to be in focus (steps S1-1 to S1-*n* of FIG. 2). As indicated by reference numeral 61, when leading to the focus closeout, the object is focused at some degree. In this state, it is possible to detect the face. Thereafter, as indicated by reference numeral 62, when leading to the focus closeout, the face detection operation is performed to detect the face (step S2 of FIG. 2). Thereafter, as indicated by reference numeral 63, the face is focused by finely adjusting the lens drive to cause the face to be in focus (steps S2 and S3 of FIG. 2).

As described above, in the case of the face detection auto-selection one-shot AF, the focus closeout width is widened, and the face detection accumulation is performed by the AE sensor immediately after entering the focus closeout position. Therefore, face detection auto-selection one-shot AF time may be reduced.

While the exemplary embodiments of the present invention have been described above, the present invention is not limited to these exemplary embodiments and various changes and modifications may be made without departing from the scope of the present invention.

OTHER EMBODIMENTS

Aspects of the present invention can also be realized by performing a process mentioned below. That is, a software (program) which realizes functions of above embodiments is supplied to a system or apparatus through a network or various storage media, and a computer (or devices such as a CPU or MPU) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-133101, filed on Jun. 15, 2011, which is hereby incorporated by reference herein in its entirety.

What is claimed is:

1. An image pickup apparatus comprising:

a first detection unit arranged to detect a position of an object from a signal obtained through photoelectric conversion by a first sensor;

a second detection unit arranged to detect a defocus amount of a plurality of focus areas from a signal acquired from photoelectric conversion by a second sensor; and a controller configured to control to move a lens in accordance with a defocus amount detected by the second detection unit to reduce a defocus amount of a focus area selected from among the plurality of focus areas, wherein the controller controls the first detection unit to detect the position of the object to select a focus area based on a detected position of the object, and wherein the controller performs the selection of the focus area by controlling the first detection unit in a case where the second detection unit detects the defocus amount which is smaller than a first amount.

2. The image pickup apparatus according to claim 1, the image pickup apparatus is arranged to perform charge accumulation after the object is caused to be in focus, wherein a photometry value is calculated from the accumulated charges.

3. The image pickup apparatus according to claim 1, the image pickup apparatus is arranged to perform pixel addition readout after charge accumulation which is performed after the object is caused to be in focus.

4. The image pickup apparatus according to claim 1, the image pickup apparatus is arranged to perform full pixel readout after charge accumulation for object detection.

5. A control method of an image pickup apparatus, comprising:

a first detection step of detecting a position of an object from a signal obtained through photoelectric conversion by a first sensor;

a second detection step of detecting a defocus amount of a plurality of focus areas from a signal acquired from photoelectric conversion by a second sensor; and a control step of controlling to move a lens in accordance with a defocus amount detected in the second detection step to reduce a defocus amount of a focus area selected from among the plurality of focus areas, wherein the control step controls the first detection step to detect the position of the object to select a focus area based on a detected position of the object, and wherein the control step performs the selection of the focus area by controlling the first detection step in a case where the second detection step detects the defocus amount which is smaller than a first amount.

6. A non-transitory computer readable storage medium storing a program comprising a program code for causing a computer to execute the control method according to claim 5.

7. The image pickup apparatus according to claim 1, wherein the object is a face.

8. The control method of claim 5, wherein the object is a face.

9. A non-transitory computer readable storage medium storing a program comprising a program code for causing a computer to execute the control method according to claim 8.

10. An image pickup apparatus comprising:

a first detection unit arranged to detect an object image from a signal obtained through photoelectric conversion by a first sensor;

a second detection unit arranged to detect a defocus amount of a plurality of focus areas from a signal acquired from photoelectric conversion by a second sensor; and a controller configured to control to move a lens in accordance with a defocus amount detected by the second detection unit to reduce a defocus amount of a focus area selected from among the plurality of focus areas, wherein the controller controls the first detection unit to detect the position of the object image to select a focus area based on a detected object image, and wherein the controller performs the selection of the focus area by controlling the first detection unit in a case where the second detection unit detects the defocus amount which is smaller than a first amount which is easier to detect the object image than a second amount greater than the first amount.

11. The image pickup apparatus according to claim 1, the image pickup apparatus is arranged to perform charge accumulation after the object image is caused to be in focus, wherein a photometry value is calculated from the accumulated charges.

12. The image pickup apparatus according to claim 1, the image pickup apparatus is arranged to perform pixel addition readout after charge accumulation which is performed after the object image is caused to be in focus.

13. The image pickup apparatus according to claim 1, the image pickup apparatus is arranged to perform full pixel readout after charge accumulation for object image detection.

14. The image pickup apparatus according to claim 1, wherein the object image is a face image.

15. The image pickup apparatus according to claim 1, wherein the first amount is a defocus amount until reaching an in-focus state by once more lens drive.

16. The image pickup apparatus according to claim 1, wherein the first amount is wider than a defocus amount in the autoselection one-shot AF that performs no object image detection.

17. A control method of an image pickup apparatus, comprising:

a first detection step of detecting an object image from a signal obtained through photoelectric conversion by a first sensor;

a second detection step of detecting a defocus amount of a plurality of focus areas from a signal acquired from photoelectric conversion by a second sensor; and a control step of controlling to move a lens in accordance with a defocus amount detected in the second detection step to reduce a defocus amount of a focus area selected from among the plurality of focus areas, wherein the control step controls the first detection step to detect the object image to select a focus area based on a detected object image, and wherein the control step performs the selection of the focus area by controlling the first detection step in a case where the second detection step detects the defocus amount which is smaller than a first amount which is easier to detect the object image than a second amount greater than the first amount.

18. A non-transitory computer readable storage medium storing a program comprising a program code for causing a computer to execute the control method according to claim 17.

19. The control method of claim 17, wherein the object image is a face image.

20. A non-transitory computer readable storage medium storing a program comprising a program code for causing a computer to execute the control method according to claim 19.

* * * * *